(12) United States Patent
Regnier

(10) Patent No.: US 7,519,674 B2
(45) Date of Patent: Apr. 14, 2009

(54) METHOD AND APPARATUS FOR FILTERING ELECTRONIC MESSAGES

(75) Inventor: Alain Regnier, Sunnyvale, CA (US)

(73) Assignee: Nuxo Technologies, Inc., Belmont, CA (US)

( * ) Notice: Subject to any disclaimer, the term of this patent is extended or adjusted under 35 U.S.C. 154(b) by 223 days.

(21) Appl. No.: 11/514,658

(22) Filed: Sep. 1, 2006

(65) Prior Publication Data

US 2008/0059589 A1    Mar. 6, 2008

(51) Int. Cl.
G06F 15/16    (2006.01)
G06F 15/173   (2006.01)

(52) U.S. Cl. .................. 709/206; 709/203; 709/219; 709/224; 709/227

(58) Field of Classification Search .................. 709/206, 709/207, 203, 219, 224, 227; 713/170; 705/67
See application file for complete search history.

(56) References Cited

U.S. PATENT DOCUMENTS

| | | | |
|---|---|---|---|
| 6,112,227 | A | 8/2000 | Heiner |
| 6,199,102 | B1 | 3/2001 | Cobb |
| 6,546,416 | B1 | 4/2003 | Kirsch |
| 6,691,156 | B1 | 2/2004 | Drummond et al. |
| 6,868,498 | B1 | 3/2005 | Katsikas |
| 7,039,949 | B2 | 5/2006 | Cartmell et al. |
| 2003/0233418 | A1 | 12/2003 | Goldman |
| 2004/0122847 | A1 | 6/2004 | Rodgers |
| 2004/0243844 | A1* | 12/2004 | Adkins ........................ 709/206 |
| 2004/0249901 | A1* | 12/2004 | Wallace et al. ............... 709/207 |
| 2005/0044154 | A1 | 2/2005 | Kaminski et al. |
| 2005/0055410 | A1* | 3/2005 | Landsman et al. .......... 709/206 |
| 2005/0125667 | A1* | 6/2005 | Sullivan et al. ............. 713/170 |
| 2005/0182735 | A1* | 8/2005 | Zager et al. .................... 705/67 |
| 2005/0198171 | A1* | 9/2005 | Landsman et al. .......... 709/206 |
| 2006/0095524 | A1* | 5/2006 | Kay et al. .................... 709/206 |
| 2006/0242244 | A1* | 10/2006 | Logue et al. ................. 709/206 |

\* cited by examiner

*Primary Examiner*—Quang N. Nguyen
(74) *Attorney, Agent, or Firm*—Young Basile

(57) ABSTRACT

A method is provided for filtering electronic messages such as unsolicited bulk email. The method includes establishing a communications connection with the remote server under the Simple Email Transfer Protocol or other suitable protocol; accepting session data from the remote server; and determining if the session data meets criteria associated with legitimate messages. If the data pertaining to the connection does not meet the criteria associated with legitimate messages, then one or more stimulus signals are sent to the remote server. If the server responds to the stimulus signal in the manner required by the communications protocol, then the session can be added to a database of known sessions. The session is then terminated by responding to the server with a temporary error message in accordance with the protocol. If the remote server is a legitimate server complying with the STMP, it will resend the message after a prescribed time period.

21 Claims, 5 Drawing Sheets

METHOD AND APPARATUS FOR FILTERING ELECTRONIC MESSAGES

TECHNICAL FIELD

The present invention relates to the field of electronic messaging generally and in particular to methods for filtering unsolicited email.

BACKGROUND

Email over the Internet and other networks have become a mainstay of business and personal communications. Email over the Internet is typically sent using the Simple Mail Transfer Protocol ("SMTP"), a popular text based mail transport and delivery protocol. SMTP is defined in The Internet Society Request of Comment ("RFC") No. 2821 (April 2001), which is hereby incorporated by reference.

SMTP contemplates that transmission of emails occurs from a sending user's host (or "originating server") to the receiving user's host (or "receiving server") when the two hosts are connected to the same network such as the Internet or other transport service or connected to different networks coupled by a gateway.

Under SMTP, the sending and receiving servers establish a communications connection over the transport service. Then, the originating server (sometimes referred to herein as the remote server) initiates a mail transaction, which includes commands to specify certain information about the session, including the originator and destination of the mail. This information is referred to as the "envelope." Next the originating server sends a command to transmit the message content itself. The message content is composed of a header and a body. The header includes structured field/value pairs. The body is the actual message which can be formatted in accordance with MIME, for example.

The receiving server responds to each command with a reply. For example, replies indicate that the command was accepted or that a temporary or permanent error condition exists. Replies include three digit codes (such as "250").

Unsolicited bulk email ("UBE"), popularly known as "spam," is a growing problem for email users. Spam clogs users' inboxes, wastes network bandwidth, consumes human and machine resources to evaluate and discard, and often is used to disseminate malicious code or perpetrate fraud or other unlawful or undesirable activity.

A number of approaches have been proposed to address the problem of UBE. One approach is to assess the content incoming email and to filter out messages with certain content associated with UBE. However, senders quickly adapt content to circumvent these systems. In response, ever more aggressive content filters may be utilized. However, this leads to false positives—that is, legitimate emails that are flagged or filtered as UBE.

When legitimate emails are filtered as UBE, users do not receive potentially important communications. To mitigate this risk, filtered UBE can be placed into a quarantine for periodic review by the user. However, this consumes human and machine resources and can delay receipt of an urgent legitimate email that is mistakenly filtered as UBE place into quarantine.

Another approach is to post suspect UBE senders on a deny list. However, spenders of spam will frequently change servers, sometimes hijacking otherwise legitimate systems. This counter-tactic limits the effectiveness of the deny list.

Another approach that has been adopted is the challenge response system, in which the recipient mail server sends a challenge to unknown mail sender and quarantines the sender's mail until the sender provides an appropriate response to the challenge. A drawback to this system is that it imposes delay and inconvenience on legitimate but unknown senders. Also, if a legitimate sender does not for whatever reason respond to the challenge, then the incoming email will not be received.

It would be desirable to more completely filter UBE while avoiding mistakenly filtering legitimate email. As used in this application, the term "legitimate" means a message other than UBE or other types of bulk email that are either prohibited by law or that are communications that computer users generally do not wish to receive. The term "legitimate" as applied to a sender or connection means a sender or connection not engaged in sending UBE.

SUMMARY OF THE INVENTION

A method and apparatus is provided for filtering UBE. In accordance with one aspect of the invention, a method is provided for processing a message sent by a remote server in accordance with a communications protocol, such as SMTP. The method includes establishing a communications connection with the remote server, accepting from the remote server data pertaining to the connection, including information pertaining to at least one of the following: the remote server, the sender of the message, the destination of the message, and determining if the data pertaining to the connection meets criteria associated with legitimate messages. If the data pertaining to the connection does not meet the criteria associated with legitimate messages, then a stimulus signal is sent to the remote server. Further processing of the session then proceeds depending on whether the remote server responds to the stimulus signal in the manner required by the communications protocol.

In accordance with another aspect of the invention, an apparatus is provided for processing a message sent by a remote server in accordance with a communications protocol. The apparatus includes a communications port adapted for establishing a communications connection with the remote server, a database of known connections, and a processor coupled to the communications port and the database of known connections. The processor is programmed to accept as input from the remote server data pertaining to the connection, including information pertaining to one or more of the remote server, the sender of the message and the destination of the message. The processor uses the database of known connections to determine if the data pertaining to the connection meets criteria associated with legitimate messages. The processor sends a stimulus signal to the remote server if the data pertaining to the connection does not meets the criteria associated with legitimate messages. The processor processes the connection in response to whether the remote server responds to the stimulus signal in the manner required by the communications protocol.

In accordance with yet another aspect of the invention, computer program product is provided for processing a message sent by a remote server. The computer program product includes a computer data storage medium and computer program instructions recorded on the computer data storage medium. The computer program instructions are executable by a computer processor. When executed, the instructions cause the processor to accept as input from the remote server data pertaining to the connection, including information pertaining to at least one of the following: the remote server, the sender of the message, the destination of the message, determine if the data pertaining to the connection meets criteria associated with legitimate messages, send a stimulus signal to the remote server if the data pertaining to the connection does not meet the criteria associated with authorized messages, and process the connection in response to whether the remote server responds to the stimulus signal in the manner required by the communications protocol.

BRIEF DESCRIPTION OF THE DRAWINGS

The description herein makes reference to the accompanying drawings wherein like reference numerals refer to like parts throughout the several views, and wherein.

DETAILED DESCRIPTION OF THE EMBODIMENTS

Figure 1:
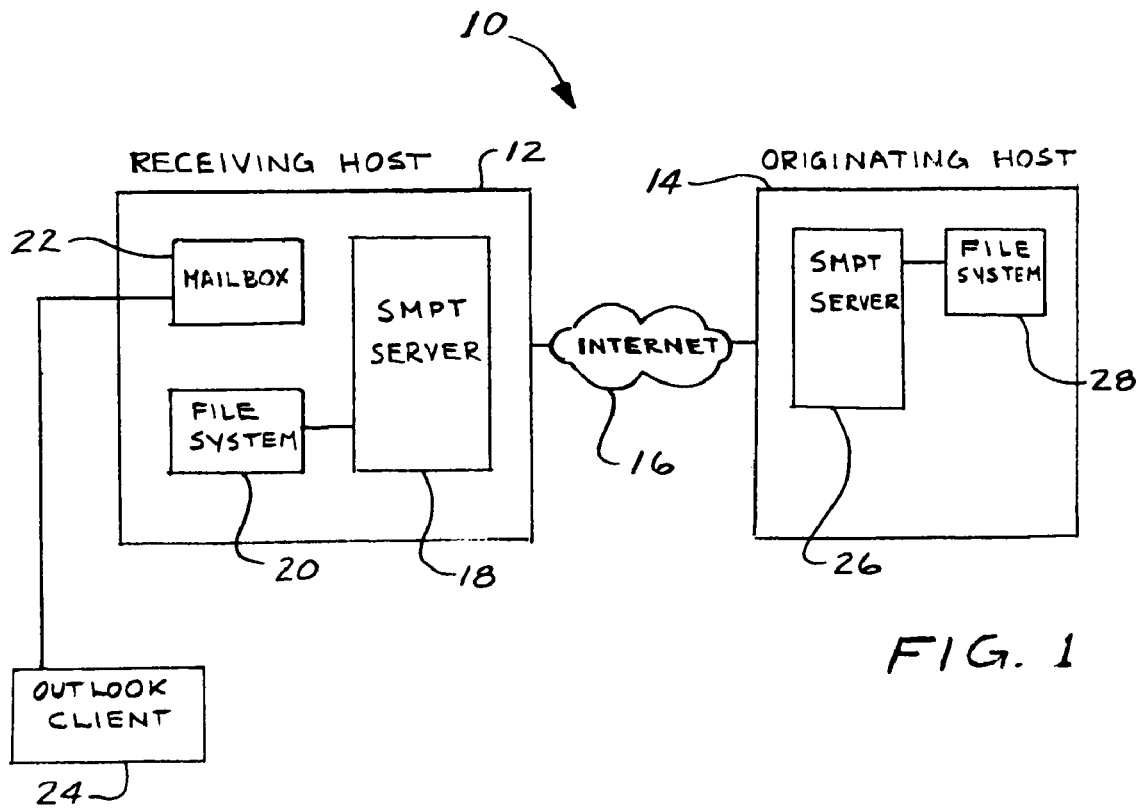
FIG. 1 is a block diagram of an email system in which embodiments of the present invention are implemented.

Referring to FIG. 1, an email system 10 is illustrated in which embodiments of the present invention are implemented. Email system 10 includes a receiving host 12 and an originating server 14 in communications via the public Internet 16 to transfer email using SMTP. The disclosed embodiments can be implemented using any suitable messaging protocol and is not limited to email or SMTP. The disclosed embodiments can also be implemented over any suitable type of network and are not limited to use with the public Internet.

Receiving host 12 includes an receiving server 18 coupled to a file system 20 and a mailbox 22. Other configurations for receiving host 12 are possible and ancillary equipment and software such as firewalls have been omitted for ease of understanding the invention. A desktop email client 24 such as Microsoft Outlook™ is coupled to the mailbox. Originating host 14 includes a remote or originating server 26 that is coupled to a file system 28. With respect to its outgoing email communications, originating server 26 is sometimes referred to as the client in the SMTP specifications.

In accordance with SMTP, originating server 26 on host 14 initiates a connection with server 18 on host 12 for purposes of transmitting one or more emails in the course of a communications session. The communications session includes a series of commands issued by originating server 26 and replies issued by receiving server 18. The following table illustrates a simplified session between a receiving server ("S") and an originating server ("C"):

TABLE ONE

S: 220 www.foo.com ESMTP Postfix
C: HELLO target.com
S: 250 Hello target.com
C: MAIL FROM:<sender@target.com>

TABLE ONE-continued

S: 250 Ok
C: RCPT TO:<recipient@foo.com>
S: 250 Ok
C: DATA
S: 354 End data with <CR><LF>.<CR><LF>
C: Subject: test message
C: From: sender@target.com
C: To: recipient@foo.com
C:
C: Test data.
C: .
S: 250 Ok: queued as 12345
C: QUIT
S: 221

In each session, the originating server 26 transmits data that initiates, constitutes or otherwise pertains to the session itself before transmitting the message content. This session information, also known as session data, can be contained in the message envelopes or can be information derived from the syntax, order or context of the session commands transmitted by the originating server. For example, session information can include the IP address of the originating server, envelope sender of the message, and the envelope destination of the message. Part of this information is typically placed in a message envelope. After receiving and processing the envelope, the server 18 receives the message content, which comprises a header section and a body.

Figure 2:
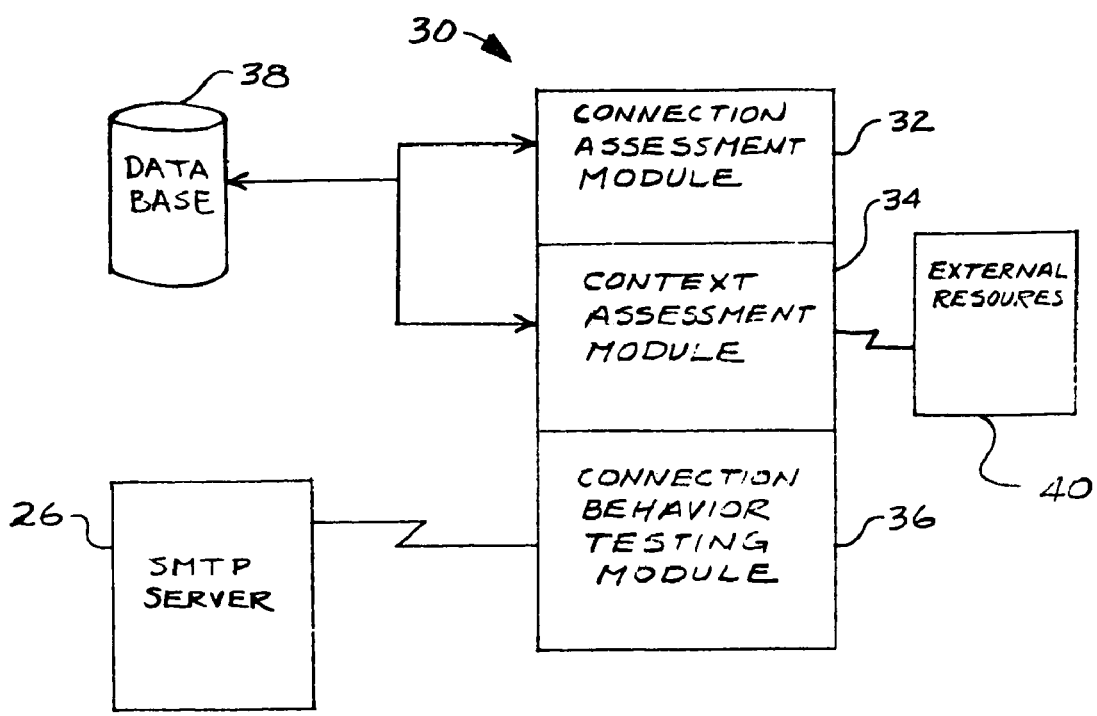
FIG. 2 is a block diagram illustrating in greater detail a filtering module for use in the email system shown in FIG. 1.

It is desired to filter UBE and other unauthorized messages that are sent to receiving host 12. Referring to FIG. 2, a filtering system 30 which resides on SMTP server 18 filters incoming SMTP sessions to temporarily reject UBE and other unauthorized messages. As will be explained below, temporary rejection of messages can occur after the envelope is received but before the message content is transferred to the receiving hosts. For ease of illustration, filtering module 30 is disclosed herein as software implemented only on SMTP server 18. However, the programming logic of filtering module 30 can be distributed over more than one computer or implemented in hardware if desired.

Filtering system 30 includes a connection assessment module 32, a context assessment module 34 and a connection behavior testing module 36. Connection assessment module 32 and context assessment module 34 assesses the data pertaining to the session for new connections to determine whether that data meets criteria associated with legitimate email. These criteria are discussed below in detail, but generally speaking can include primary criteria (which if met mean that a connection is legitimate and will be accepted) and secondary criteria (which if met mean that a connection is possibly legitimate but will not at this time be accepted; instead information about the connection will be recorded for use in future sessions involving the same originating server and sender).

Connection assessment module 32 is in communications with a database 38 which includes information about known connections including historical transactions with known connections. Database 38 can reside locally on receiving host 12 or can be hosted remotely and can include information gathered by receiving host 12 or by multiple hosts. Database 38 can be a single database or can be distributed in different physical databases. Connection assessment module 32 assesses the information in the envelope to determine whether the connection is a priority connection or at least a known connection. A priority connection is a connection identified in database 38 as legitimate. Priority connections can be identified in the database by the IP address of the originating server, the envelope sender, the envelope destination or a combination of all three.

A "known" connection is a connection that has similar characteristics as connections previously established with the receiving server 18. Such similar characteristics can include the IP address of the originating server, envelope sender, envelope destination, subnet for the originating server 26. Once connection assessment module 32 identifies a connection as being known, it can query database 38 for historical transaction data involving the connection to determine if the connection is legitimate. This historical transaction data can include for example the number of previous times that the connection has attempted delivery. If the number of attempted deliveries exceeds a predetermined threshold (such as three for example), then the connection can be considered both known and legitimate. Other historical data that can be used to validate a connection includes the amount of time that has elapsed since the connection was last established with the destination server or with any server belonging to a given set of destination servers, with longer time periods indicative of non-UBE messages.

Connection assessment module 32 can use other criteria to determine if a connection is priority, known or otherwise legitimate. Criteria should be selected that are associated with legitimate messages.

Context assessment module 34 can be applied to previously unknown connections. Context assessment module 34 can also coupled to database 38 as well as external resources 40. Context assessment module 34 applies additional inquiries or criteria based on information other than the data pertaining to the connection that is transmitted by the originating server. These contextual inquiries can include:

is the remote server on only one black list? [−1 if yes]
is the remote server on more than one black list? [−3 if yes]
is the remote server on a local whitelist? [+5 if yes]
has the remote server attempted delivery of an email to a large number of different destinations over a short period of time? [−2 if yes]
is the remote server not allowed to send emails as part of the domain specified in the envelop sender? [−5 if yes]
does the reverse DNS of the remote server match the sender information in the envelope? [+1 if yes, −1 if no]
is the remote server known on the local server as a server with which connections are often established? [+2 of yes]

A heuristic approach can be used for assessing context. For example, each inquiry or criteria can be assigned a given weight (as illustrated in brackets above) and an overall context assessment score can be computed adding up the resulting scores. If the context assessment achieves a predetermined minimum score (such as 6 using the weightings illustrated above), the context of the connection is deemed favorable. Otherwise, the context is deemed unfavorable. Other suitable scoring schemes and algorithms can be used.

Behavior testing module 36 can be applied to those connections who are neither priority or known and that have either favorable or unfavorable contexts. Behavior testing module generates a reply or other stimulus signal which is transmitted to the originating server to determine whether the originating server will respond in the manner required by SMTP or the applicable protocol under which the message has been transmitted.

To comply with SMTP or other protocol requires time and resources. Senders of UBE and other unauthorized messages are motivated to send many millions of messages as cheaply and quickly as possible, and accordingly they do not choose to expend the time and resources required to comply with the protocol.

If an originating server complies with the applicable protocol, it is more likely to be operated by a legitimate sender of email (as opposed to a spammer) and accordingly the message is likely to be legitimate. On the other hand, if the originating server does not comply with the applicable protocol, it is more likely a spammer and accordingly the message is likely to be UBE or other unauthorized email.

Various stimulus signals may be employed, including: transmitting queries that are not frequently used; transmitting a reply after a delay of at ten to thirty seconds or more since the originating server's command is received; transmitting a reply that requires the originating server to send messages one at a time; and not accepting commands that are transmitted in the wrong order.

More than one stimulus signal can be used. Other suitable stimulus signals can be used. Information about how the originating server 26 responds to the stimulus signal or signals can be added to database 38. For example, if originating server 26 responds to the stimulus signal or signals in accordance with SMTP or other applicable protocol, then the connection can be added to database 38 as a known connection.

Figure 3:
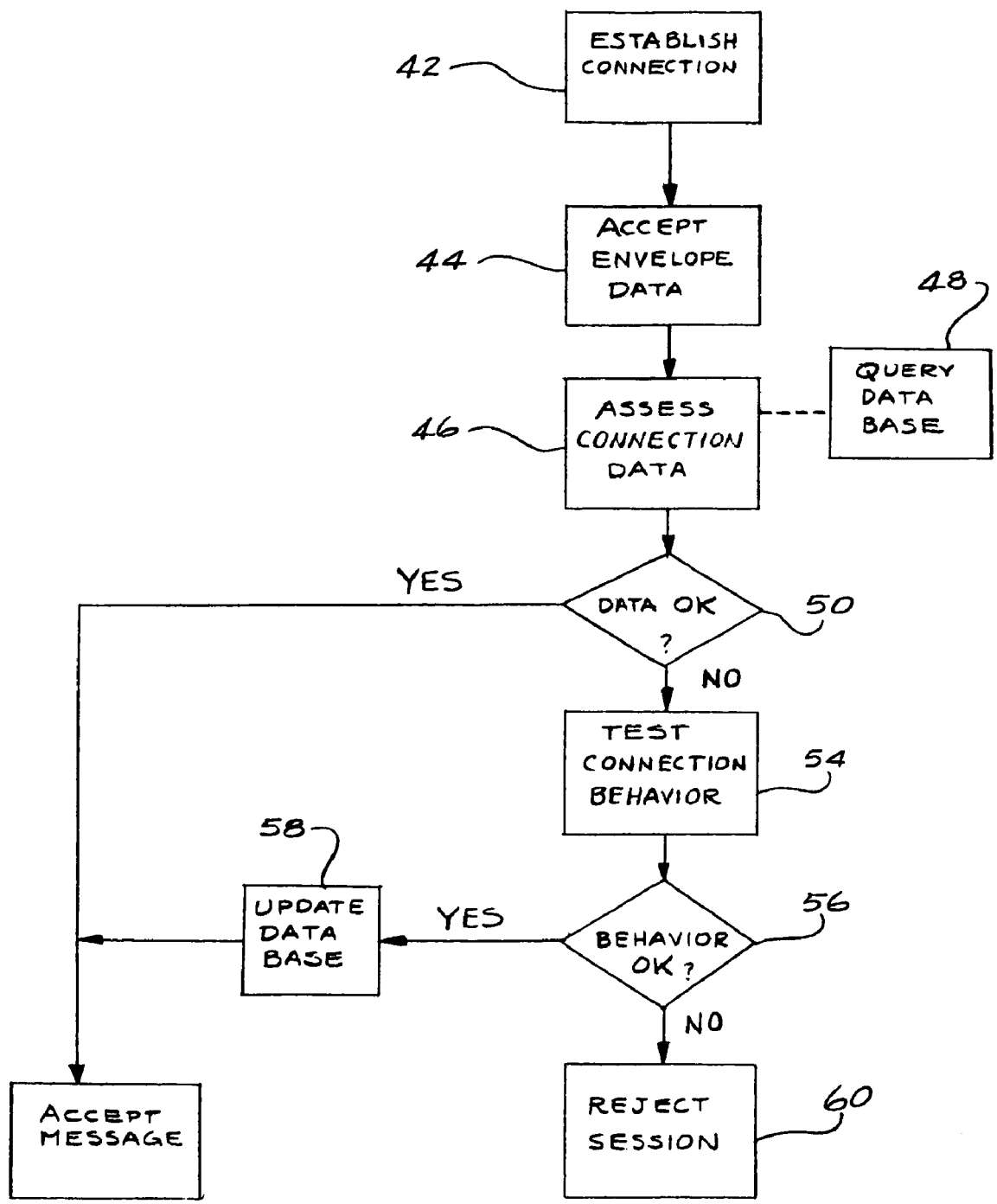
FIG. 3 is a flow chart of the operation of the filtering module of FIG. 2 in accordance with a first embodiment of the invention.

Referring to FIG. 3, the operation of filtering system 30 is illustrated in accordance with a first embodiment. Beginning at block 42, a connection is established over the Internet between originating server 26 and receiving server 18. At block 44, originating server 26 sends and receiving server 18 receives session data. At block 46, the receiving server 18 uses the filtering system 30 to assess the session data. As illustrated in block 48, this assessment will include queries to database 38 as well as other external resources (not shown in FIG. 3).

As explained above, the assessment of session data can be made using either or both of connection assessment module 32 and context assessment module 34. The objective of the assessment is to apply to the session data one or more tests or other criteria that are associated with the authentic messages. For example, connection assessment module 32 can determine if the connection is a priority connection. Context assessment module 34 can apply additional tests or criteria to previously unknown connections, such determining whether the remote server is on a black list. The invention is not limited to specific tests or criteria that make use of session data. Other appropriate tests and criteria will occur to those skilled in the art of electronic messages and these can be used as well.

At decision block 50, a determination is made as to whether the session data has met the applicable tests or other criteria to conclude that the connection is legitimate. If the session data has met the test or other criteria, then control moves to block 52, where the filtering system 30 accepts the message content. If the session data does not meet the test or other criteria, then control moves to block 54, where connection behavior testing module 36 sends a stimulus to originating server 26 to determine if originating server 26 is compliant with SMTP or other applicable protocol.

At decision block 56, a determination is made as to whether the behavior of sending server 26 is compliant with SMTP or other applicable protocol. If the behavior is compliant, control moves to block 58, where database 38 is updated with information about the connection. For example, the connection may be indicated as a "known" or "priority" connection in database 38. Control then moves to block 52, where the filtering system 30 accepts the message content.

If at block 56 it is determined that the behavior of originating server 26 is not compliant with SMTP or the applicable standard, then control moves to block 60, where the session is temporarily rejected. Rejection can be accomplished by sending a reply to the originating server 26 that indicates the occurrence of a temporary error or other problem at the receiving server 18 and can request the originating server 26 to resend the message. For example, with the SMTP protocol a 4xx reply may be sent.

A temporary error reply is in effect another means of testing behavior of the originating server. Servers that send UBE or other unauthorized messages typically do not comply with requirements under SMTP or other protocols to resend messages after receiving a temporary error response. Thus, UBE or other unauthorized messages will likely not be resent, thus reducing spam. However, legitimate messages from legitimate sources are likely to be resent. Alternatively, at block 60, the session can be rejected a non-temporary basis.

At block 60, database 38 can be updated with information from the envelope of the rejected connection, which can be deemed as "known" even if rejected. Because spammers are unlikely to reestablish the connection, the database may accumulate a large number of connections that have been seen only once or seen multiple times, but only during a single, short time period such as an hour for example. These one-time connections can be periodically purged from the database. Alternatively, they can be removed if they were last seen more than, for example, twelve months ago.

Figure 4:
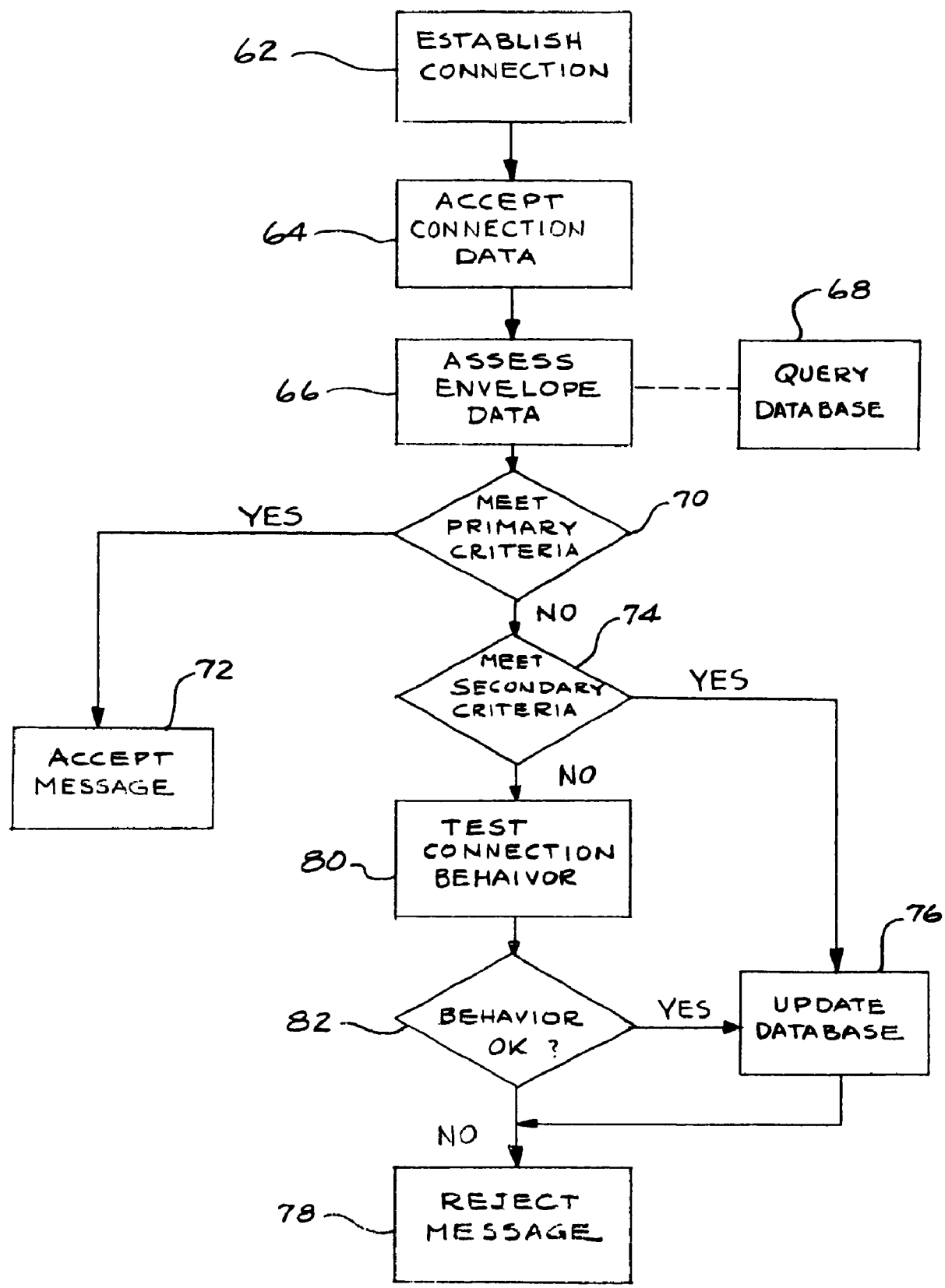
FIG. 4 is a flow chart of the operation of the filtering module of FIG. 2 in accordance with a second embodiment of the invention.

Referring to FIG. 4, the operation of filtering system 30 is illustrated in accordance with a second embodiment. Beginning at block 62, a connection is established over the Internet between originating server 26 and receiving server 18. At block 64, originating server 26 sends and receiving server 18 receives session data. At block 66, the receiving server 18 uses the filtering system 30 to assess the session data. As illustrated in block 68, this assessment will include queries to database 38 as well as other external resources (not shown in FIG. 4).

As explained above, the assessment of session data at block 66 can be made using either or both of connection assessment module 32 and context assessment module 34. The objective of the assessment is to apply to the session data one or more tests or other criteria that are associated with the authentic messages. For example, connection assessment module 32 can determine if the connection is a priority connection. Context assessment module 34 can apply additional tests or criteria to previously unknown connections, such determining whether the remote server is on a black list. The invention is not limited to specific tests or criteria that make use of session data. Other appropriate tests and criteria will occur to those skilled in the art of electronic messages and these can be used as well.

The tests and criteria that are applied at decision block 66 can be placed into two or more groups including primary criteria and secondary criteria. Primary criteria are tests or other criteria which, if met, indicate that the connection is authorized or otherwise legitimate. For example, a primary criteria can be that the connection is a priority connection on database 38. Another primary criteria can be that the connection is known and that the historical transaction data for the connection indicates that it is legitimate.

Secondary criteria are tests or other criteria which if met indicate a possibility that a connection is authorized. For example a secondary criteria can be that a connection is known (but is not associated with historical transaction data indicating legitimacy) based on the content of database 38. Another secondary criteria can be that the connection, if not known, at least has a favorable context as determined by context assessment module 34.

At decision block 70, a determination is made as to whether the session data has met the applicable primary criteria. If the session data has met primary criteria, then control moves to block 72, where the filtering system 30 accepts the message content. If the session data does not meet the primary criteria, then control moves to decision block 74, where determination is made as to whether the session data meets the secondary criteria. If the session data has met the secondary criteria, then control moves to block 76 where database 38 is updated with information about the connection. For example, the connection may be indicated as a "known" or "priority" connection in database 38. Control then moves to block 78 where filtering system 30 rejects the connection as described below.

If at decision block 74 it is determined that the session data has not met the secondary criteria, then control moves to block 80, where connection behavior testing module 36 sends one or more stimulus signals to originating server 26 to determine if originating server 26 is compliant with SMTP or other applicable protocol. At decision block 82, a determination is made as to whether the behavior of sending server 26 is compliant with SMTP or other applicable protocol. If the behavior is compliant, control moves to block 76, where database 38 is updated with information about the connection. For example, the connection may be indicated as a "known" or "priority" connection in database 38. Control then moves to block 78, where filtering system 30 rejects the connection as described below.

At block 78, rejection can be accomplished on a temporary-basis by sending a reply to the originating server 26 that indicates the occurrence of a temporary error or other problem at the receiving server 18 and can require the originating server 26 to resend the message as explained above. Alternatively, rejection at block 78 can be on a non-temporary basis. Note that if database 38 is updated at block 76 for connections that have not meet the primary or secondary criteria, then the database may accumulate a large number of connections from spammers. The one-time connections can be periodically purged from the database as described above.

In effect, the application of primary and secondary criteria divide connections into three categories of trust levels: (1) those connections that have sufficient indications of legitimacy (i.e., meet the primary criteria) and are therefore considered legitimate; (2) those connections that have intermediate indications of legitimacy (i.e., meet the secondary criteria but not the primary criteria) and are therefore considered possibly legitimate; and (3) those connections that have insufficient indications of legitimacy (i.e. do not meet the primary or secondary criteria) and are therefore considered suspect. Legitimate connections are accepted. Connections that are possibly legitimate are posted to the database (step 76) and then temporarily rejected (step 78). The filtering system 30 can be programmed so that it is more likely to treat such connections as being legitimate if they are re-established following rejection. Connections whose legitimacy is suspect are subjected to testing by connection behavior testing module 36 (step 80). If the behavior test indicate compliance with the protocol, then the connections are treated as possibly legitimate and posted to the database (step 76) and then temporarily rejected (step 78).

Connections can be divided up into more granular categories of trust by increasing the number of classes of criteria that are applied, such as primary, secondary and tertiary.

Figure 5:
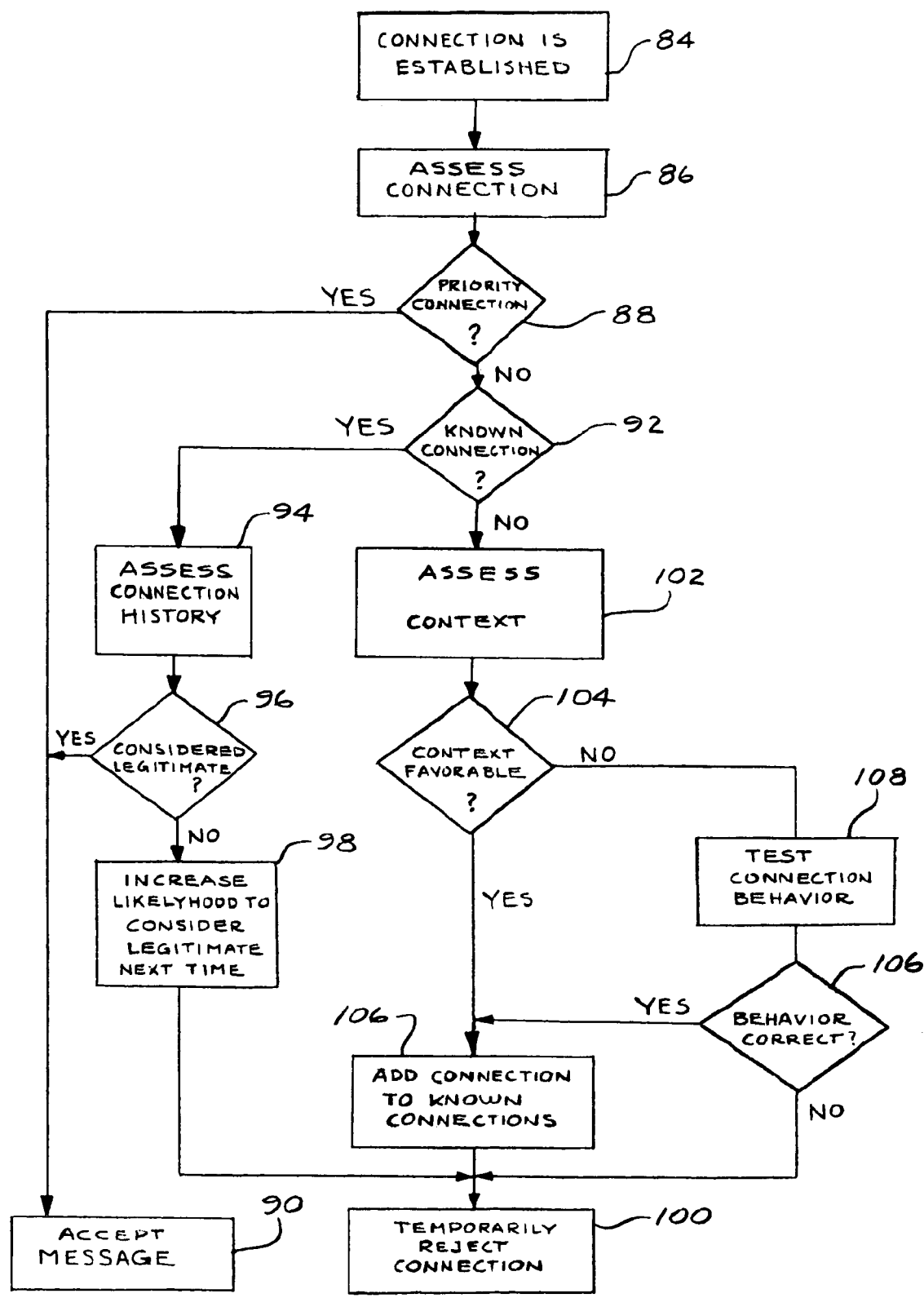
FIG. 5 is a flow chart of the operation of the filtering module of FIG. 2 in accordance with a third embodiment of the invention.

Referring to FIG. 5, the operation of filtering system 30 is illustrated in accordance with a third embodiment. Beginning at block 84, a connection is established over the Internet between originating server 26 and receiving server 18. At block 85, originating server 26 sends and receiving server 18 receives session data. At block 86, the receiving server 18 uses the filtering system 30 to assess the session data. This assessment can include queries to database 38 as well as other external resources (not shown in FIG. 5).

Specifically, connection assessment module 32 determines if the connection is a priority connection or a known connection. At decision block 88, if the connection is a priority connection, then control moves to block 90, where the filtering system 30 accepts the message content. If the connection is not a priority connection, then control moves to decision block 92. At decision block 92, if the connection is a known connection, then control moves to block 94. At block 94, connection assessment module 32 can query database 38 for historical transaction data involving the connection to determine if the connection is legitimate. This historical transaction data can include for example the number of previous times that the connection has attempted delivery. If the number of attempted deliveries exceeds a predetermined threshold (such as three for example), then the connection can be considered both known and legitimate. Other historical data that can be used to validate a connection includes the amount of time that has elapsed since the connection was last established, with longer time periods indicative of non-UBE messages.

At decision block 96, if the connection is considered legitimate, then control moves to block 90, where filtering system 30 accepts the message content. If the connection is not considered legitimate, then control moves to block 98, where filtering system 30 updates database 38 with information about the connection. Depending on the specific algorithm used to determine if a known connection is legitimate, the accumulation of historical transaction data in database 38 can increase the chances that filtering system 30 will conclude that a connection is legitimate. For example, a known connection can be considered legitimate if delivery is attempted N times, where N is a predetermined number between 1 and 4. Control then moves to block 100, where filtering system 30 temporarily rejects the connection.

Referring back to decision block 92, if the connection is not a known connection, then control moves to block 102, where connection context assessment module can assess previously unknown connections. Context assessment module 34 applies additional tests or other criteria to determine if the context of the connection is favorable, as explained above. Context assessment module 34 can also be coupled to database 38 as well as to external resources 40.

At decision block 104, if the context of the connection is favorable, control moves to block 106, where filtering system 30 updates database 38 with information about the connection, including adding the connection to the list of known connection.

Referring back to decision block 104, if context assessment module 34 determines that the context of the connection is not favorable, then control moves to block 108, where connection behavior testing module 36 sends a stimulus to originating server 26 to determine if originating server 26 is compliant with SMTP or other applicable protocol.

At decision block 110, if behavior testing module 36 determines that the behavior of sending server 26 is compliant with SMTP or other applicable protocol, then control moves to block 106, where database 38 is updated with information about the connection, including adding the connection to the list of known connection. If behavior testing module 36 determines that the behavior of sending server 26 is not compliant with SMTP or other applicable protocol, then control moves to block 100, where filtering system 30 temporarily rejects the connection.

Because database 38 is updated at block 106, if the connection is re-established in the future, it will be identified as a known connection at block 92 and potentially accepted if connection assessment module 32 determines that the connection is legitimate (block 96). Other information about the connection can be recorded in database 38 and depending on the specific algorithm used to determine if a known connection is legitimate, the accumulation of that historical transaction data in database 38 can increase the chances that filtering system 30 will conclude that a connection is legitimate in a future communications session.

After processing at block 106, control moves to block 100, where the filtering system 30 temporarily rejects the connection by sending a reply to the originating server 26 that indicates the occurrence of a temporary error or other problem at the receiving server 18 and can require (in accordance with the applicable protocol) that the originating server 26 resend the message as explained above. Although the protocol requires the sender to resend the message, sender of UBE often ignore such requirements.

Note that if a connection meets certain primary criteria (such as being a priority connection at decision block 88 or being a known and legitimate connection at decision block 96), then the connection is considered authentic and is accepted. If a connection does not meet these primary criteria but meets certain secondary criteria (such as at least being known or having a favorable context) then information about the connection is added to database 38 (at blocks 98 and 106), increasing the probability that it will be accepted in a future session. If the connection does not meet either the primary or secondary criteria, then the connection is rejected. However, before rejecting the connection, behavior testing module 36 tests the behavior of the originating server 26, and if the originating server 26 behaves in accordance with the applicable protocol, then information about the connection is added to the database 38 (at block 106).

Figure 6:
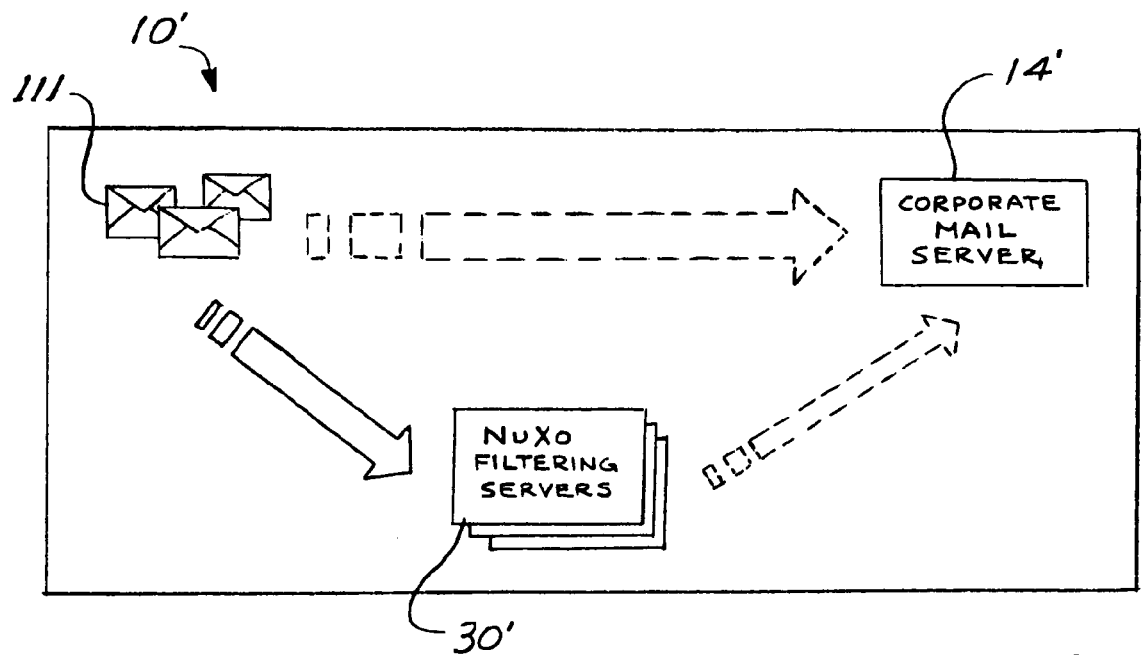
FIG. 6 is a block diagram of an email system in accordance with a fourth embodiment of the invention.

Referring to FIG. 6 a block diagram of an email system 10' illustrated in accordance with a fourth embodiment of the invention. Email system 10' includes a receiving host 14'. Incoming STMP connections 111 are redirected from email system 10' to a server separate server on which a filtering system 30' resides. Filtering system 30' is substantially identical to filtering system 30 described above. Filtering system 30' accepts legitimate email in accordance with the first through third embodiments described above and then forwards those accepted emails to the receiving host 14'.

Figure 7:
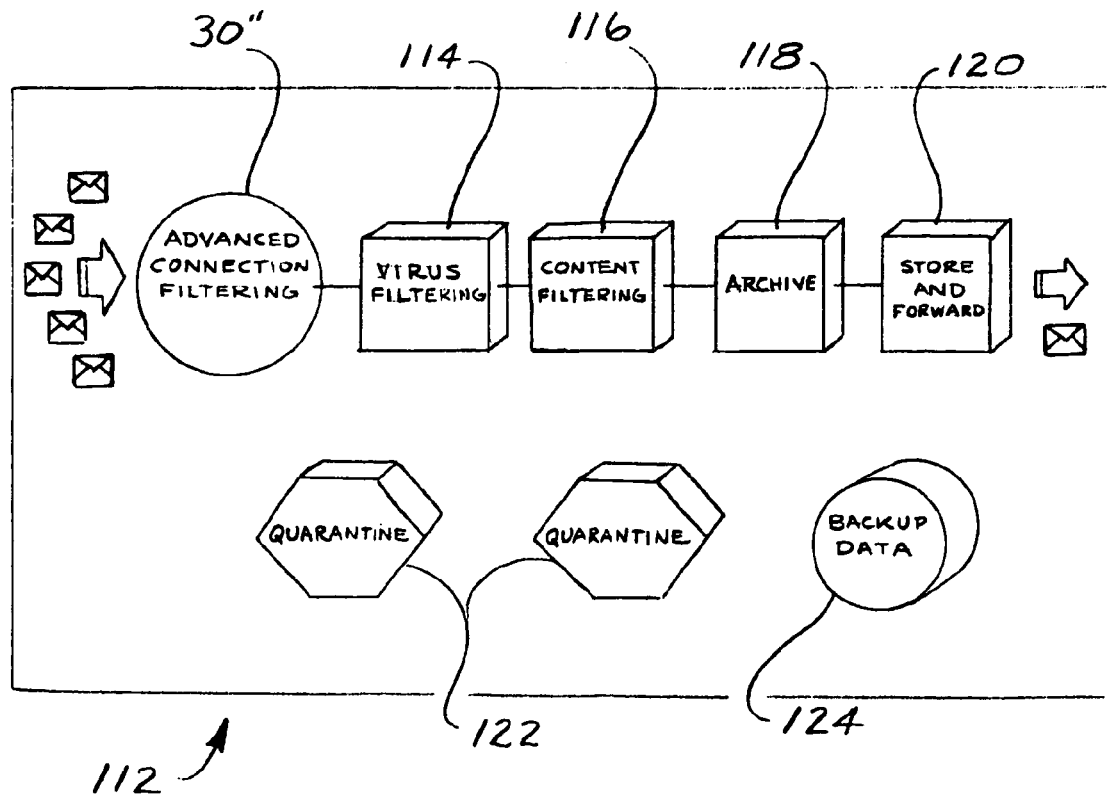
FIG. 7 is a block diagram of an email system in accordance with a fifth embodiment of the invention.

Referring to FIG. 7, a block diagram of an email system 112 illustrated in accordance with a fourth embodiment of the invention. A filtering system 30" can be part of a larger system 112 for processing incoming messages. Filtering system 30" is substantially identical to filtering system 30 described above. Larger system 112 includes a virus filtering module 114, a content filtering module 116, an archive module 118 and a store and forward module 120. Virus filtering module 114 and content filtering module 116 are coupled to quarantines 122 to store suspect messages. Archive module 118 is coupled to backup data storage 124 to hold archived messages. Larger system 112 can be implemented on incoming server 18.

When filtering system 30" is used in larger system 112, it can be placed at the front end to filter out incoming suspect incoming email messages based on session data without the requirement of receiving and processing message content.

Because connections bearing suspect messages can be temporally rejected, legitimate senders will attempt future delivery of legitimate messages.

The filtering system 30" can provide processing efficiencies by rejecting suspect messages based on session data because computationally expensive processing of message content can be avoided. Also, because the content of suspect emails is not received, storage demands are reduced.

Also, the above-mentioned embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for processing an email message having message content and sent by a remote server in accordance with a communications protocol, the method comprising:
    (a) establishing a communications connection with the remote server;
    (b) exchanging a plurality of session messages defining a communications session with the remote server, at least some of which are separate from the message content;
    (c) accepting from the remote server session data pertaining to the communications connection, including information pertaining to at least one of the following: the remote server, the sender of the email message, the destination of the email message;
    (d) determining if the session data meets criteria associated with legitimate messages;
    (e) if the session data does not meet the criteria associated with the legitimate messages, testing the behavior of the remote server by sending to the remote server at least one stimulus signal configured to generate a machine-originated response from the remote server in accordance with the communications protocol to determine if the remote server is operation in accordance with the communications protocol, the testing initiated during the communications session; and
    (f) processing the communications connection in response to whether the remote server is operating in accordance with the communications protocol;
    wherein the at least one stimulus signal is one of a command and a reply, the format and content of which are specified by the communications protocol.

2. The method of claim 1 wherein the communications protocol is the Simple Mail Transport Protocol, the email message includes a message envelope, and the session data includes data contained in the message envelope.

3. The method of claim 2, wherein the step of processing the connection includes accepting the message content if the remote server responds to a stimulus signal in the manner required by the communications protocol.

4. The method of claim 1, further comprising:
    providing a database of known connections, wherein the step of determining if the session data meets criteria associated with legitimate messages is performed using the database of known connections; and where in the criteria include primary criteria and secondary criteria;
    accepting the email message if the session data meets the primary criteria; and
    adding session data to the database of known connections if the session data does not meet the primary criteria but does meet the secondary criteria;
    wherein if the remote server responds to the stimulus signal in the manner required by the communications protocol, then the step of processing the connection includes adding data about the connection to the database of known connections.

5. The method of claim 4, further comprising:
    if the session data does not meet the primary criteria, then the stimulus signal includes sending an error code to the remote server which error code is prescribed under the protocol as requiring the remote server to resend the email message after a period of time.

6. The method of claim 1, wherein if the remote server responds to the stimulus signal in the manner required by the communications protocol, then the step of processing the connection includes adding data about the connection to a database of known connections.

7. The method of claim 6, wherein determining if the session data meets criteria associated with legitimate messages comprises comparing the session data to data in the database of known connections.

8. The method of claim 1, further comprising:
    if the session data does not meet the criteria associated with legitimate messages, then sending an error code to the remote server which error code is prescribed under the protocol as requiring the remote server to resend the email message after a period of time.

9. The method of claim 1, wherein if the step of processing the connection includes sending reply to the remote server which reply is prescribed under the protocol as requiring the remote server to resend the email message after a period of time.

10. The method of claim 1, wherein determining if the session data meets criteria associated with legitimate messages comprises at least one of: determining if the connection is a priority connection, determining if the connection is a known connection, and determining if the connection context is favorable.

11. The method of claim 1, wherein determining if the session data meets criteria associated with legitimate messages comprises:
    providing a database of known connections;
    wherein the criteria associated with legitimate messages is whether the connection is a known connection based on the database of known connections.

12. The method of claim 1, further comprising:
    accepting the message content if the session data meets the criteria associated with legitimate messages.

13. The method of claim 1 wherein determining if the session data meets criteria associated with legitimate messages comprises:
    providing a database of known connections;
    determining if whether the connection is a known connection based on the database of known connections;
    if the connection is a known connection, then determining if the history of the connection history meets the criteria of legitimate connection histories;
    if the connection is a known connection and the history of the connection meets criteria of legitimate connection histories, then accepting the email message; otherwise sending an error code to the remote server which error code is prescribed under the protocol as requiring the remote server to resend the email message after a period of time.

14. The method of claim 13, wherein determining if the session data meets criteria associated with legitimate messages further comprises:

if the connection is not a known connection and the session data meets criteria associated with legitimate messages, then adding the connection to the database of known connections.

15. The method of claim 13, wherein determining if the session data meets criteria associated with legitimate messages further comprises:
   if the connection is not a known connection, then determining if he context of the connection meets criteria of favorable connection contexts; and
   if the connection is not a known connection and the context of the connection meets the criteria of favorable connection contexts, then adding the connection and the context of the connection to the database of known connections.

16. The method of claim 1, wherein the at least one stimulus signal comprises one of:
   sending one of the plurality of session messages to the remote server in a manner that does nor comply with the protocol in terms of at least one of timing, format and content;
   sending to the remote server at least one session message with a format and content as specified by the communications protocol;
   sending a reply session message to the remote server in response to a command session message transmitted by the remote server, wherein the time that elapses between the receipt of the command session message and the sending of the reply session message is at least about five to ten seconds; and
   terminating the communications connection.

17. The method of claim 1, wherein at least one of testing the behavior of the remote server and processing the connection comprises:
   sending to the remote server at least one session message, the format and content of which are specified by the communications protocol, which session message .is configured to generate a machine-originated response from the remote server in accordance with the communications protocol; and
   determining whether the remote server responds to the session message in accordance with the communications protocol.

18. A method for processing a message sent by a remote server in accordance with a communications protocol, wherein the message includes an envelope and a message content, comprising:
   (a) establishing a communications connection with the remote server:
   (b) accepting from the remote server session data pertaining to the connection, including information pertaining to at least one of the following: the remote server; the sender of the message; the destination of the message;
   (c) determining if the session data meets criteria associated with legitimate messages;
   (d) sending one or more stimulus signals to the remote server if the session does not meet the criteria associated with legitimate messages; and
   (e) processing the connection in response to whether the remote server responds to the stimulus signal in the manner required by the communications protocol;
   wherein determining if the session data meets criteria associated with legitimate messages further comprises:
   determining if the connection is a priority connection;
   accepting the message content if it is a priority connection;
   providing a database of known connections;
   if the connection is not a priority connection, then determining if the connection is a known connection by reference to the database of known connections;
   if the connection is a known connection, then determining if the, connection meets criteria associated with legitimate messages;
   if the connection is a known connection and if the connection meets criteria associated with legitimate messages, then accepting the connection;
   if the connection is a known connection but does not meet the criteria associated with legitimate messages, then updating the database of information about known connections and sending an error code to the remote server which error code is prescribed under the protocol as requiring the remote server to resend the message after a period of time.

19. The method of claim 18, wherein determining if the session data meets criteria associated with legitimate messages further comprises:
   if the connection is not a priority connection and if the connection is not a known connection, then determining whether a context associated with the connection is favorable;
   if the context associated with the connection is favorable, then adding the connection to the historical information about known connections and sending an error code to the remote server which error code is prescribed under the protocol as requiring the remote server to resend the message after a period of time; and
   if the context associated with the connection is not favorable, then identifying the connection as a connection that does not meet the criteria associated with legitimate messages.

20. An apparatus for processing an email message having an envelope and a message content and sent by a remote server in accordance with the SMTP communications protocol, comprising:
   a communications port adapted for establishing a communications connection with the remote server;
   a database of known connections;
   a processor coupled to the communications port and the database of known connections and adapted to:
      exchange a plurality of session messages defining a communications session with the remote server, at least some of which are separate from the message content;
      accept as input from the remote server session data pertaining to the communications connection, including information pertaining to at least one of the following: the remote server, the sender of the email message, the destination of the email message;
      use the database of known connections to determine if the session data pertaining to the communications connection meets criteria associated with legitimate messages;
      if the session data does not meet the criteria associated with the legitimate messages, test the behavior of the remote server by sending to the remote server at least one stimulus signal configured to generate a response from the remote server in accordance with the SMTP communications protocol, wherein the at least one of stimulus signal is one of a command and a reply, the format and content of which are specified by the SMTP communications protocol, the testing initiated during the communications session; and process the communications connection in response to whether the remote server responds to the stimulus signal in the manner required by the SMTP communications protocol.

21. A computer program product for processing an email message having message content and sent by a remote server in accordance with a communications protocol, comprising:
a computer data storage medium;
computer program instructions, recorded on the computer data storage medium, executable by a computer processor to:
establish a communications connection with the remote server;
exchange a plurality of session messages defining a communications session, at least some of which are separate from the message content;
accept as input from the remote server session data pertaining to the communications connection, including information pertaining to at least one of the following: the remote server, the sender of the email message, the destination of the email message;
use a database of known connections to determine if the session data pertaining to the communications connection meets criteria associated with legitimate messages;
if the session data does not meet the criteria associated with the legitimate messages, test the behavior of the remote server to determine if it complies with the communications protocol by sending to the remote server a stimulus signal configured to stimulate a response from the remote server in accordance with the communications protocol, the testing initiated during the communications session; and
process the communications connection in response to whether the remote server responds to the stimulus signal in the manner required by the communications protocol;
wherein the stimulus signal is one of a command and a reply, the format and content of which are specified by the communications protocol.

\* \* \* \* \*